(12) United States Patent
Nakamura

(10) Patent No.: US 8,220,912 B2
(45) Date of Patent: Jul. 17, 2012

(54) INK COMPOSITION AND INKJET RECORDING METHOD

(75) Inventor: Ippei Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 464 days.

(21) Appl. No.: 12/509,505

(22) Filed: Jul. 27, 2009

(65) Prior Publication Data

US 2010/0053290 A1   Mar. 4, 2010

(30) Foreign Application Priority Data

Sep. 1, 2008 (JP) ................................. 2008-223776

(51) Int. Cl.
*G01D 11/00* (2006.01)
(52) U.S. Cl. ........... 347/100; 347/95; 523/160; 523/161
(58) Field of Classification Search .................. 347/100, 347/95, 96, 101, 102, 103; 106/31.13, 31.6, 106/31.27; 523/160, 161
See application file for complete search history.

(56) References Cited

U.S. PATENT DOCUMENTS

| | | | |
|---|---|---|---|
| 2006/0132570 A1* | 6/2006 | Odell et al. | 347/102 |
| 2006/0159850 A1* | 7/2006 | Breton et al. | 106/31.13 |
| 2008/0022892 A1* | 1/2008 | Odell et al. | 106/31.13 |

FOREIGN PATENT DOCUMENTS

| | | |
|---|---|---|
| EP | 1642943 A | 4/2006 |
| EP | 1674539 A | 6/2006 |
| EP | 1681323 A | 7/2006 |
| JP | 5-214280 A | 8/1993 |
| JP | 8-41133 A | 2/1996 |
| JP | 2004-514014 A | 5/2004 |
| WO | 2008/015474 A | 2/2008 |
| WO | 2008/053235 A | 5/2008 |

* cited by examiner

*Primary Examiner* — Manish S Shah
(74) *Attorney, Agent, or Firm* — SOLARIS Intellectual Property Group, PLLC

(57) ABSTRACT

The present invention provides an ink composition including:
(A) a polymerizable compound represented by the following formula (I);
(B) a polymerizable compound having a structure that is different from that of the polymerizable component (A); and
(C) a photoinitiator,

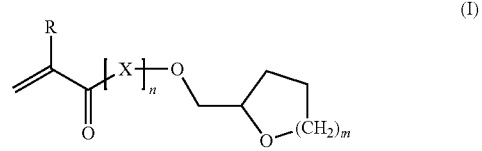

(I)

wherein, in the formula (I), R represents a hydrogen atom or a methyl group, X represents a divalent organic group, m represents an integer of 1 or 2, and n represents an integer of 1 to 20.

9 Claims, No Drawings

INK COMPOSITION AND INKJET RECORDING METHOD

CROSS-REFERENCE TO RELATED APPLICATION

This application claims priority under 35 USC 119 from Japanese Patent Application No. 2008-223776 filed on Sep. 1, 2008, the disclosure of which is incorporated by reference herein.

BACKGROUND

1. Field of the Invention

The present invention relates to an ink composition for inkjet recording, which cures by irradiation of an active radiation ray, and to a method for inkjet recording using the ink composition for inkjet recording.

2. Related Art

Various methods are known for forming an image on a recording medium such as paper based on an image data signal, for example, an electrophotographic method, a sublimation-type thermal transfer method, a melt-type thermal transfer method, and an ink jet recording method. The electrophotographic method requires a process of forming an electrostatic latent image on a photoreceptor drum by charging and light exposure, and a system therefore becomes complicated, resulting in increased production cost. The thermal transfer method can be conducted by an inexpensive apparatus, but requires use of ink ribbons, leading to increased running cost and generation of waste.

The ink jet recording method can also be conducted by an inexpensive apparatus. Moreover, an image is directly formed by jetting ink only to regions of a support which are to be image regions, and the ink can therefore be efficiently used, resulting in reduced running cost. Further, ink jet recording apparatuses are not noisy. Accordingly, the ink jet recording method is an excellent image forming method.

There is a demand for an ink composition, which is curable by irradiation of active radiation such as ultraviolet rays with high sensitivity to form high-quality images (radiation-curable ink composition), which can be used for an ink composition for ink jet recording.

Imparting a radiation-curable ink composition with high sensitivity enables a high curing property to be obtained with respect to irradiation with active radiation. Consequently, various advantages are attained including reduced electric power consumption and extension of equipment service life due to diminished load on a radiation generator and, moreover, suppression of vaporization of uncured low molecular weight matter and suppression of reduction in the strength of formed images. In addition, because high sensitivity in a radiation-curable ink composition enhances the strength of a cured film, an image region formed from such an ink composition is provided with high strength and durability.

As a UV-curable ink composition, for example, an ink composition using, in combination, mono-functional or multi-functional monomers having different functional groups from each other has been proposed (for example, see Japanese Patent Application Laid-Open (JP-A) No. 5-214280). Further, another ink composition has been proposed, which is a radiation-curable composition containing a multi-functional acrylate (for example, see JP-A No. 8-41133). These ink compositions are excellent in curing speed and can provide images free of ink bleeding, but are problematic in terms of lowering adhesiveness (adhesion) to a recording medium due to volume shrinkage upon curing.

Regarding the adhesiveness of a UV-curable ink composition to a recording medium, a radiation-curable ink jet ink composition that uses N-vinyl lactam as a component promoting adhesiveness to the recording medium and flexibility after curing has been disclosed (for example, see JP-A No. 2004-514014). However, there are concerns that N-vinyl lactams represented by N-vinyl caprolactam may generate surface tackiness of cured ink images or cause so-called "leaching" in which low molecular weight components bleed out of the surface due to their low co-polymerizable property with widely-used radical polymerizable monomers such as acrylates. Further, there are a variety of problems such as the reactivity of N-vinyl lactams leading to poor storage stability due to, for example, an increase in ink viscosity.

As discussed above, an ink composition that exhibits excellent stability and safety for use in an ink jet apparatus while maintaining excellent adhesiveness to a recording medium, excellent curing sensitivity, and excellent image strength is sought after; however, at present, such an ink composition is not available.

SUMMARY

The present invention has been made in view of the above circumstances and provides an ink composition and an inkjet recording method.

A first aspect of the invention provides an ink composition comprising:

(A) a polymerizable compound represented by the following formula (I);

(B) a polymerizable compound having a structure that is different from that of the polymerizable component (A); and (C) a photoinitiator,

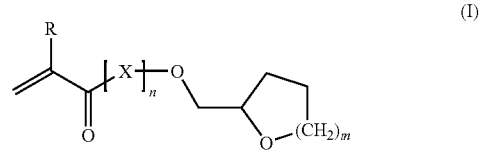

(I)

wherein, in the formula (I), R represents a hydrogen atom or a methyl group, X represents a divalent organic group, m represents an integer of 1 or 2, and n represents an integer of 1 to 20.

DETAILED DESCRIPTION OF THE INVENTION

It is deduced that, by incorporating the polymerizable compound represented by the above-mentioned formula (I) into the curable ink composition, improvement of the curing sensitivity with respect to an active radiation ray can be achieved together with softness of the cured film (image), and tight adhesion of the ink image may be improved since the affinity and compatibility to media to be printed are improved, due to the specific structures of the furan ring or pyran ring and the linking group, by incorporating the polymerizable compound represented by the above-mentioned formula (I) into the curable ink composition.

Ink Composition

The ink composition of the invention includes (A) a polymerizable compound represented by the following formula (I), (B) a polymerizable compound having a structure that is different from that of the component (A), and (C) a photoinitiator, and has a property to be cured by irradiation of an active radiation ray. Hereinafter the ink composition having such property is referred to as a radiation-curable ink composition.

The essential components for the radiation-curable ink composition of the invention are sequentially explained below.

(A) Polymerizable Compound Represented by the Formula (I)

The radiation-curable ink composition of the invention includes (A) a polymerizable compound represented by the following formula (I) (hereinafter suitably referred to as "specific polymerizable compound").

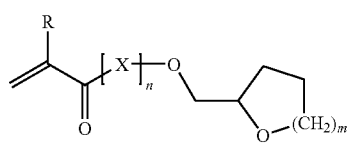

(I)

In the formula (I), R represents a hydrogen atom or a methyl group, X represents a divalent organic group, m represents an integer of 1 or 2, and n represents an integer of 1 to 20.

The specific polymerizable compound (A) used in the invention may be any compound as long as it is encompassed in the compound represented by the formula (I). Hereinafter the specific preferable compounds are exemplified, but the invention is not limited to these compounds.

In the formula (I), R is a hydrogen atom or a methyl group. R is preferably a hydrogen atom in view of the curing property of the radiation-curable ink composition.

In the formula (I), X is a divalent organic group. Preferable examples of the organic group may include an alkylene group having 2 to 12 carbon atoms, or a divalent organic group in which 1 or 2 or more methylene groups (—CH$_2$—) in an alkylene group having 1 to 12 carbon atoms have been replaced with structures selected from an ether bond (—O—), a carbonyl group (—CO—) and —NH—, wherein the divalent organic group may be substituted by substituents selected from an alkyl group having 1 to 4 carbon atoms, an alkoxy group and a hydroxyl group.

Preferable examples of the divalent organic group for X may include the groups represented by any of the following formulae (2) to (4). Furthermore, the divalent organic linking group represented by X may be constituted as a combination of a plurality of the groups represented by any of the formulae (2) to (4).

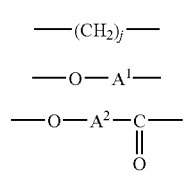

(2)
(3)
(4)

In the formula (2), j represents an integer of 1 to 12, and in this case, X represents an alkylene group having 1 to 12 carbon atoms. Where X is a group represented by the formula (2), j is preferably an integer of 4 to 8, in view of the viscosity and odor of the specific polymerizable compound.

In the formula (3), A$^1$ represents a linear or branched chain alkylene group having 2 to 4 carbon atoms. The alkylene group of the formula (3) is preferably an alkylene group having 2 or 3 carbon atoms, more preferably an ethylene group (—CH$_2$CH$_2$—) or a propylene group (—CH$_2$CH(CH$_3$)—), in view of the curing property and flexibility after curing of the composition.

In the formula (4), A$^2$ represents a linear or branched chain alkylene group having 2 to 8 carbon atoms. The alkylene group of the formula (4) is preferably an alkylene group having 3 to 6 carbon atoms, more preferably a butylene group (—(CH$_2$)$_4$—) or a pentamethylene group (—(CH$_2$)$_5$—), in view of the curing property and flexibility after curing of the composition.

In the formula (I), n represents an integer of 1 to 20, preferably an integer of 1 to 4, more preferably an integer of 1 or 2, and still more preferably n is 1 in view of the viscosity of the specific polymerizable compound. Where n is 2 to 20, the plural X may be the same or different from each other. For example, where —(X)$_2$— is used, the divalent organic linking group represented by this formula may be constituted by bonding an alkylene group constituted by bonding one or a plurality of the methylene groups represented by the above-mentioned formula (2) with an oxyalkylene group represented by the above-mentioned formula (3).

In the formula (I), m is an integer of 1 or 2. Where m is 1, the ring structure is a 5-membered hetero ring including an oxygen atom, and where m is 2, the ring structure is a 6-membered hetero ring. Of these, m is preferably 1 in view of the tight adhesion of the cured ink composition to media to be printed.

Hereinafter the specific examples (A-1 to A-12) of the specific polymerizable compound of the invention are listed, but the specific polymerizable compound of the invention is not limited to these compounds.

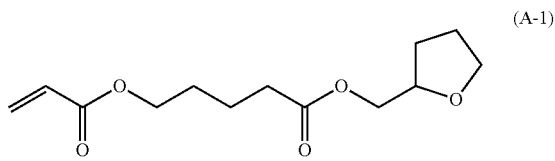

(A-1)

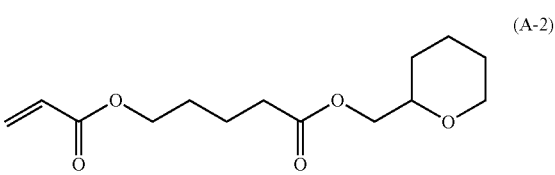

(A-2)

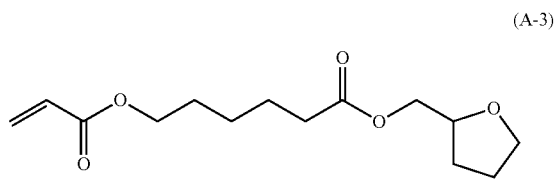

(A-3)

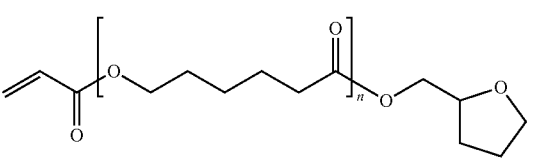

(A-4)

Mixture of n = 1 to 4

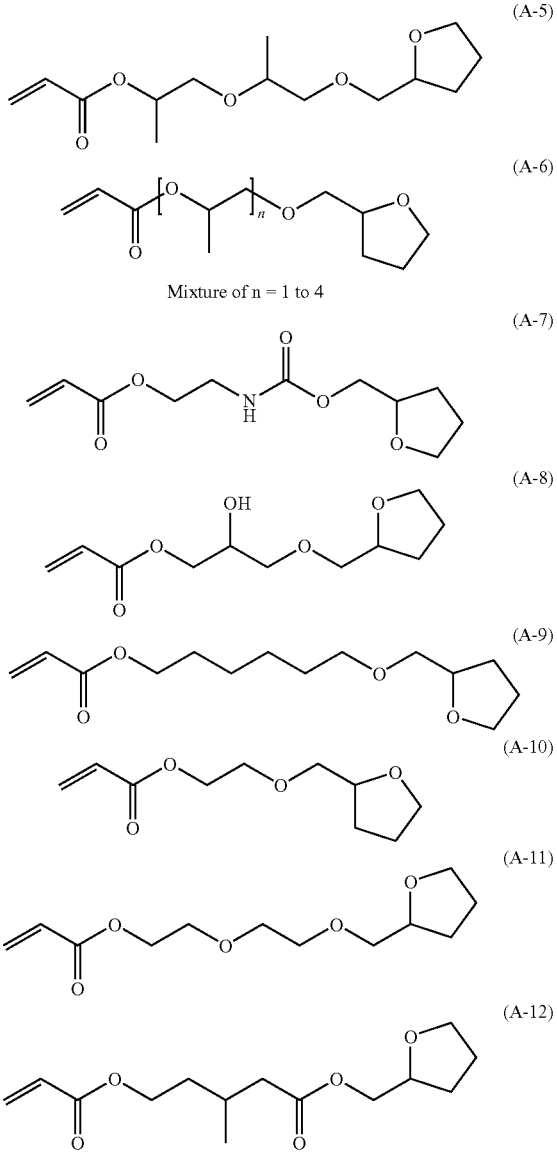

Of these specific examples, the exemplified compounds (A-1), (A-3) to (A-6), (A-9) and (A-10) are more preferable, and the exemplified compounds (A-3) and (A-5) are specifically preferable.

The specific polymerizable compound for the invention may be synthesized by, for example, known methods described in documents such as JP-A Nos. 56-75482 and 1-85969.

The content of the specific polymerizable compound (A) in the composition of the invention is preferably in the range of 1% by mass to 50% by mass, more preferably in the range of 5% by mass to 35% by mass, still more preferably in the range of 10% by mass to 30% by mass, with respect to the total mass of the ink composition, in view of the curing velocity, tight adhesion between the cured film and recording medium, and inkjet compatibility of the ink composition.

The specific polymerizable compound (A) may be used by solely one kind or as a combination of two or more kinds in the ink composition of the invention.

(B) Polymerizable Compound Having Structure That is Different From That Of Component (A) (Other Polymerizable Compound)

The ink composition of the invention includes (B) a polymerizable compound having a structure that is different from that of the component (A) (hereinafter suitably referred to as other polymerizable compound) besides the above-mentioned specific polymerizable compound (A).

The other polymerizable compound that may be used in combination in the invention may be either of a radical polymerizable compound or a cation polymerizable compound, and may be suitably selected according to the properties of the objective ink composition, or the relation with the following radical polymerization initiator.

Hereinafter the other polymerizable compound (B) that may be applied to the invention is further explained.

The radical polymerizable compound is a compound having a radical-polymerizable ethylenic unsaturated bond. It may be any compound as long as it has at least one radical-polymerizable ethylenic unsaturated bond in the molecule, and includes those having a chemical structure of a monomer, oligomer, polymer or the like. The radical-polymerizable compound may be used by solely one kind, or as a combination of two or more kinds in any ratio so as to improve the objective property. It is preferable to use a combination of two or more kinds in view of control of performances such as reactivity and physical properties.

Examples of the polymerizable compound having a radical-polymerizable ethylenic unsaturated bond may include radical polymerizable compounds such as unsaturated carboxylic acids such as acrylic acid, methacrylic acid, itaconic acid, crotonic acid, isocrotonic acid and maleic acid, and salts thereof, anhydrides having an ethylenic unsaturated group, acrylonitrile, and styrene, as well as various unsaturated polyesters, unsaturated polyethers, unsaturated polyamides, and unsaturated urethanes.

Specific examples may include acrylic acid derivatives such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl)propane, polyethyleneglycol diacrylate, polypropyleneglycol diacrylate, dipentaerythritol tetraacrylate, trimethylolpropane triacrylate, oligoester acrylate, N-methylol acrylamide, diacetone acrylamide, epoxy acrylate, isobornyl acrylate, dicyclopentenyl acrylate, dicyclopentenyloxyethyl acrylate and dicyclopentanyl acrylate; methacrylate derivatives such as n-butyl methacrylate, allyl methacrylate, glycidyl methacrylate, benzyl methacrylate, dimethylaminomethyl methacrylate, polyethyleneglycol dimethacrylate, polypropyleneglycol dimethacrylate and 2,2-bis(4-methacryloxypolyethoxyphenyl)propane; as well as derivatives of allyl compounds such as allyl glycidyl ether, diallyl phthalate and triallyl trimellitate. More specifically, the commercial products described in Shinzo Yamashita ed., "Crosslinking Agent Handbook" (1981, Taiseisha), Eiichiro Takiyama, "Polyester Resin Handbook" (1988, The Nikkan Kogyo Shimbun Ltd.), and the like, or radical polymerizable or crosslinkable monomers, oligomers and polymers known in the art may be used.

Of these acrylates and methacrylates, acrylates of an alcohol having an ether oxygen atom such as tetrahydrofurfuryl acrylate and 2-phenoxyethyl acrylate are preferable, in view of the curing property and the physical properties of the cured film.

Furthermore, for the same reason, acrylates of an alcohol having an aliphatic ring structure are also preferable, and specific examples of the preferable ones may include acrylates having a bicyclo or tricyclo ring structure such as isobornyl acrylate, dicyclopentenyl acrylate, dicyclopentenyloxyethyl acrylate and dicyclopentanyl acrylate, of which dicyclopentenyl acrylate and dicyclopentenyloxy ethylacrylate, which have a double bond in an aliphatic ring structure, are specifically preferable.

Moreover, vinyl ether compounds may also be used as the radical polymerizable compound. Preferable examples of the vinyl ether compound may include di- or tri-vinyl ether compounds such as ethyleneglycol divinyl ether, ethyleneglycol monovinyl ether, diethyleneglycol divinyl ether, triethyleneglycol monovinyl ether, triethyleneglycol divinyl ether, propyleneglycol divinyl ether, dipropyleneglycol divinyl ether, butanediol divinyl ether, hexanediol divinyl ether, cyclohexanedimethanol divinyl ether, hydroxyethyl monovinyl ether, hydroxynonyl monovinyl ether and trimethylolpropane trivinyl ether; monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-O-propylenecarbonate, dodecyl vinyl ether, diethyleneglycol monovinyl ether and octadecyl vinyl ether.

As the vinyl ether compound, commercial products such as RAPI-CURE DVE-3 and RAPI-CURE DVE-2 (both manufactured by ISP Europe) may also be used.

Alternatively, (meth)acrylic acid esters (hereinafter suitably referred to as acrylate compounds) such as (meth)acrylic monomers or prepolymers, epoxy monomers or prepolymers, and urethane monomers or prepolymers may be used as the polymerizable compound, and examples of the compounds may include the following compounds.

Namely, the examples may include EO adduct acrylate, modified glycerin triacrylate, bisphenol A diglycidyl ether acrylic acid adduct, modified bisphenol A diacrylate, phenoxy-polyethyleneglycol acrylate, PO adduct diacrylate of bisphenol A, EO adduct diacrylate of bisphenol A, dipentaerythritol hexaacrylate, pentaerythritol triacrylate trylene-diisocyanate urethane prepolymer, lactone-modified flexible acrylate, propyleneglycol diglycidyl ether acrylic acid adduct, pentaerythritol triacrylate hexamethylenediisocyanate urethane prepolymer, ditrimethylolpropane tetraacrylate, pentaerythritol triacrylate hexamethylenediisocyanate urethane prepolymer, lactone-modified acrylate, and the like.

These acrylate compounds are preferable as polymerizable compounds that have been used in UV-curable inks since they have a low skin stimulus property and a low sensitivity (susceptibility to rash), may provide a relatively low viscosity and a stable ink jetting property, and have a fine polymerization sensitivity and a fine adhesion to recording media.

The monomers listed here as the other polymerizable compound have a low sensitivity even they have a low molecular weight, and have a high reactivity, a low viscosity, and an excellent adhesion to recording media.

In order to further improve the sensitivity, bleeding and adhesion to recording media, it is preferable to use a combination of a monoacrylate and a multifunctional acrylate monomer or multifunctional acrylate oligomer having a molecular weight of 400 or more, and preferably 500 or more, as the other polymerizable compound components.

Furthermore, preferable exemplary embodiments include an exemplary embodiment in which at least three polymerizable compounds which include a mono functional monomer, a difunctional monomer, and a tri- or higher functional monomer are used in combination as the other polymerizable compound components since sensitivity, bleeding and adhesion to recording media may be further improved while maintaining safety.

As the monoacrylate, stearyl acrylate, isoamylacrylate, isomyristyl acrylate and isostearyl acrylate are preferable, in view of high sensitivity, low shrinking property that allows prevention of curling, prevention of bleeding, odor of the printed article, and cost reduction in the irradiation apparatus.

In the invention, where the above-mentioned acrylate compound is used as the other polymerizable compound, the above-mentioned acrylate compound is preferably 30% by mass or more, more preferably 40% by mass or more, still more preferably 50% by mass or more, with respect to the whole mass of the other polymerizable compounds. Alternatively, all of the other polymerizable compounds may be the above-mentioned acrylate compounds.

In the ink composition of the invention, the total content of the polymerizable compounds, namely, the total content of the above-mentioned specific polymerizable compound (A) and other polymerizable compound (B), is preferably 60% by mass or more and 95% by mass or less, more preferably 70% by mass or more and 90% by mass or less, relative to the whole mass of the ink composition of the invention, in view of the physical property and curing sensitivity of the ink composition.

In the above-mentioned range, the curing property and jetting stability during use in inkjet recording of the ink composition become fine.

(C) Photopolymerization Initiator

It is necessary that the ink composition of the invention comprises a photopolymerization initiator.

As the photopolymerization initiator, known photopolymerization initiators may be suitably selected and used according to the kind of the polymerizable compound to be used in combination and the purpose of use of the ink composition.

The photopolymerization initiator used in the ink composition of the invention is a compound that absorbs external energy to generate a polymerization initiating species. As the photopolymerization initiator, a known compound may be used.

Examples of the photopolymerization initiator that can be preferably used in the invention include (a) aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds containing at least one carbon-halogen bond, and (m) alkylamine compounds.

These photopolymerization initiators may be used alone, or in a combination of two or more thereof. In view of the effects, it is preferable to use two or more photopolymerization initiators.

In view of the curing property of the ink composition, (a) aromatic ketones, (b) acylphosphine oxide compounds and the like are preferable. Where they are used as a combination of two or more kinds, preferable examples may include a combination of (a) aromatic ketones and (b) acylphosphine oxide compound, and the like.

The photopolymerization initiator in the invention is used preferably in the range of 1% by mass to 50% by mass, more preferably in the range of 2% by mass to 40% by mass, still more preferably in the range of 5% by mass to 35% by mass, with respect to the total amount of the specific polymerizable compound (A) and other polymerizable compound (B), or the total amount of the specific polymerizable compound (A), other polymerizable compound (B) and the following colorant (D) where the colorant (D) is used.

The preferable content of the polymerization initiator (C) in the ink composition is in the range of 0.1% by mass to 15% by mass, preferably in the range of 1% by mass to 12% by mass.

Further, the photopolymerization initiator may be suitably contained in a mass ratio with respect to a sensitizing dye which will described later and may be used optionally, of from 200:1 to 1:200, preferably from 50:1 to 1:50, and more preferably from 20:1 to 1:5 (polymerization initiator: sensitizing dye), as a mass ratio of polymerization initiator to sensitizing dye.

(D) Colorant

When the ink composition is used for forming a color image, the ink composition of the present invention contains a colorant, although the ink composition of the invention is not necessarily used for forming a color image.

The colorant usable in the present invention is not particularly limited, and may be selected from any known colorants such as pigments, oil-soluble dyes, water-soluble dyes, and dispersing dyes. Among these, as the colorant, pigments and oil-soluble dyes that are excellent in weather resistance and have high color reproducibility are preferable, and pigments are more preferable.

As the colorant that is suitably used for the ink composition of the present invention, a compound that does not function as a polymerization inhibitor in the polymerization reaction that is a curing reaction is preferably selected, from the viewpoint of not lowering the sensitivity of the curing reaction by active radiation.

-Pigment-

There is no particular limit to the pigment for use in the invention, but examples thereof include organic and inorganic pigments described in Color Index and having the following numbers:

As for red or magenta pigments, the pigment may be Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, or Pigment Orange 13, 16, 20, or 36, or the like.

As for blue or cyan pigments, the pigment may be Pigment Blue 1, 15, 15:1, 15:2, 15:3,15:4, 15:6, 16, 17-1, 22, 27, 28, 29, 36, or 60, or the like.

As for green pigments, the pigment may be Pigment Green 7, 26, 36, or 50, or the like.

As for yellow pigments, the pigment may be Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193, or the like. Pigment Yellow 120, 155, 180 and 185 are preferable.

As for black pigments, the pigment may be Pigment Black 7, 28, or 26, or the like.

As for white pigments, the pigment may be Pigment White 6, 18, or 21, or the like.

The pigments may be selected depending on the purpose.

-Oil-Soluble Dye-

Hereinafter, oil-soluble dye usable in the present invention will be described.

When the oil-soluble dye for use in the invention is a yellow dye, the yellow dye may be any one of those known as such. Examples thereof include aryl- and heteryl-azo dyes each having as the coupling moiety a phenol, naphthol, aniline, pyrazolone, pyridone, or open-chain active methylene moiety; azomethine dyes having as the coupling moiety an open-chain active methylene moiety; methine dyes such as benzylidene dyes and monomethine oxonol dyes; quinone dyes such as naphthoquinone dyes and anthraquinone dyes; quinophtharone dyes; nitro and nitroso dyes; acridine dyes; and acridinone dyes.

When the oil-soluble dye for use in the invention is a magenta dye, the magenta dye may be any one of those known as such. Examples thereof include aryl- and heteryl-azo dyes each having as the coupling moiety a phenol, naphthol, or aniline moiety; azomethine dyes having as the coupling moiety a pyrazolone or pyrazolotriazole moiety; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and fused polycyclic dyes such as dioxazine dyes.

When the oil-soluble dye for use in the invention is a cyan dye, the cyan dye may be any one of those known as such. Examples thereof include azomethine dyes such as indoaniline dyes, indophenol dyes, and dyes having a pyrrolotriazole moiety as the coupling moiety; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl- and heteryl-azo dyes each having as the coupling moiety a phenol, naphthol, or aniline moiety; and indigo and thioindigo dyes.

The dye may be a compound having chromophore (color-forming atomic group) that dissociates to form a color such as yellow, magenta, or cyan. In this case, the dye has a counter cation, which may be an inorganic cation such as an alkali metal or an ammonium group, or an organic cation such as a pyridinium group or a quaternary ammonium salt, or a polymeric cation having, as the partial structure, a cation selected from those described above.

Typical examples thereof include, but are not limited to, C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35, 38, 67 and 70; C.I. Solvent Green 3 and 7; and C.I. Solvent Orange 2. Preferable examples of products serving as such colorants include NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (manufactured by Orient Chemical Industries, Ltd.); AIZEN SPILON BLUE GNH (manufactured by Hodogaya Chemical Co., Ltd.); and NEOPEN YELLOW 075, NEOPEN MAZENTA SE1378, NEOPEN BLUE 808, NEOPEN BLUE FF4012, and NEOPEN CYAN FF4238 (manufactured by BASF).

-Dispersing Dye-

The ink composition of the invention may contain at least one dispersing dye in such an amount that the at least one dispersing dye can be dissolved in a water-immiscible organic solvent. Examples of the dispersing dye generally include water-soluble dyes. However, the dispersing dye is preferably used in such an amount that it can be dissolved in the water-immiscible organic solvent in the invention, as described above.

Preferable specific examples of the dispersing dye include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Preferably, the colorant usable in the invention is added to the ink composition of the invention and then subjected to dispersion processing so as to be appropriately dispersed therein. Any of various dispersing machines, such as a ball mill, a sand mill, an attritor, a roll mill, an agitator, a HEN-SCHEL mixer, a colloid mill, an ultrasonic wave homogenizer, a pearl mill, a wet-type jet mill, or a paint shaker, may be used to disperse the colorant.

In addition, the ink composition of the invention may further contain at least one dispersant to disperse the colorant therein. There is no particular limit to the types of the dispersants. However, the dispersant is preferably a polymeric dispersant. The polymer dispersant is, for example, one of SOL-SPERSE series manufactured by Noveon. Inc. The ink composition may further contain, as a dispersion aid, at least one synergist suitable for the type of the pigment. In the invention, the total amount of the dispersant(s) and the dispersion aid(s) is preferably 1 to 50 parts by mass with respect to 100 parts by mass of the colorant(s).

During preparation of the ink composition of the invention, the colorant may be directly added together with the components, or may be added in advance to a solvent or to a dispersion medium such as the specific polymerizable compound (A) and polymerizable compound (B) to uniformly disperse or dissolve the colorant and incorporated so as to improve the dispersion property.

One kind or two or more kinds of colorants may be suitably selected and used according to the purpose of use of the ink composition.

Further, when the ink composition includes a colorant that remains as solid therein, such as a pigment, it is preferable that the types of the colorant, a dispersant, and a dispersion medium, and dispersion and filtration conditions are so properly selected as to control the average diameter of the colorant particles within the range of 0.005 to 0.5 µm. The average diameter is more preferably 0.01 to 0.45 µm, and still more preferably 0.015 to 0.4 µm. Controlling the average diameter of the colorant particles can suppress clogging in a nozzle head and maintains the storage stability, transparency and curing sensitivity of the ink and thus preferable.

A desired content for the colorant(s) (D) in the ink composition of the invention may be determined properly according to the application of the ink composition. The content of the colorant(s) in the ink composition is preferably 0.5 to 10% by mass, and more preferably 1 to 8% by mass with respect to the total mass of the ink composition, considering the physical properties and the coloring property of the ink composition.

When the ink composition of the invention is a white ink composition in which a white pigment such as titanium oxide is used as a colorant, the content of the colorant(s) is preferably 5 to 30% by mass, and more preferably 10 to 25% by mass, with respect to the total mass of the ink composition, from the viewpoint of ensuring covering property.

In addition to the components of (A) to (C) of the ink composition of the invention and colorant (D), the ink composition of the invention may further contain other component(s) to, for example, improve the physical properties of the ink composition, unless the component(s) does not impair the advantageous effects of the invention.

Additional components that the ink composition may contain will be described below.

(E) Sensitizing Dye

The ink composition of the invention may contain a sensitizing dye to accelerate the decomposition of the photopolymerization initiator caused by irradiation of active radiation. The sensitizing dye absorbs particular active radiation rays and is then electronically excited. When the electronically excited sensitizing dye comes into contact with a polymerization initiator, electron transfer, energy transfer, and heat generation occur. As a result, the polymerization initiator chemically changes, that is, decomposes, and generates radicals, acid or base.

The sensitizing dye may be selected in consideration of the wavelength of active radiation used to cause the photopolymerization initiator contained in the ink composition to generate initiation species. Considering the sensitizing dye being used for curing reaction of an ordinary ink composition, the sensitizing dye is preferably one of the following compounds that have an absorption wavelength in the range of 350 to 450 nm.

Examples of the sensitizing dye include polynuclear aromatic compounds (such as anthracene, pyrene, perylene, and triphenylene), thioxanthones (such as isopropylthioxanthone), xanthenes (such as fluorescein, eosin, erythrocin, rhodamine B, and rose bengal), cyanines (such as thiacarbocyanine and oxacarbocyanine), merocyanines (such as merocyanine and carbomerocyanine), thiazines (such as thionine, methylene blue, and toluidine blue), acridines (such as acridine orange, chroflavine, and acriflavine), anthraquinones (such as anthraquinone), and squaryliums (such as squarylium), and coumarins (such as 7-diethylamino-4-methylcoumarin), and among these, polynuclear aromatic compounds and thioxanthones are preferred.

(F) Co-sensitizer

The ink composition of the invention may contain a co-sensitizer. The co-sensitizer has function of improving the sensitivity of the sensitizing dye to active radiation rays, or preventing oxygen from inhibiting polymerization of the polymerizable compound.

Examples of the co-sensitizer include amines, such as those described in Journal of Polymer Society written by M. R, Sander et al., vol. 10, p. 3173, (1972), JP-B No. 44-20189, JP-A Nos. 51-82102, 52-134692, 59-138205, 60-84305, 62-18537, and 64-33104 and Research Disclosure 33825. Specific examples thereof include triethanolamine, ethyl p-dimethylaminobenzoate, p-formyldimethylaniline, and p-methylthiodimethylaniline.

Examples of the co-sensitizer further include thiols and sulfides, such as thiol compounds described in JP-A No. 53-702, JP-B No. 55-500806, and JP-A No. 5-142772, and disulfide compounds described in JP-A No. 56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Examples of the co-sensitizer further include amino acid compounds (e.g., N-phenylglycine), organic metal compounds described in JP-B No. 48-42965 (e.g., tributyltin acetate), hydrogen-donating compounds described in JP-B No. 55-34414, sulfur compounds described in JP-A No. 6-308727 (e.g., trithiane), phosphorus compounds described in JP-A No. 6-250387 (e.g., diethyl phosphite), and Si—H and Ge—H compounds described in JP-A No. 8-65779.

(G) Other Components

The ink composition of the invention may further contain other component(s), if necessary. Examples of other components include a polymerization inhibitor, and a solvent.

The polymerization inhibitor may be added to improve the storability of the ink composition. When the ink composition of the invention is used in ink jet recording, the ink composition is preferably heated at a temperature in the range of 40 to 80° C. to lower the viscosity thereof and then jetted. In such a case, the ink composition preferably contains at least one polymerization inhibitor to prevent head clogging due to thermal polymerization. The amount of the polymerization inhibitor(s) is preferably 200 to 20,000 ppm with respect to the total amount of the ink composition of the invention. Examples of the polymerization inhibitor include hydroquinone, benzoquinone, p-methoxyphenol, TEMPO, TEMPOL, and cupferron Al.

Considering that the ink composition of the invention is a radiation-curable ink composition, it is preferable that the ink composition contains no solvent. This is because not including a solvent allows the ink composition to react and cure immediately after landing on a recording medium. However, the ink composition may contain a predetermined solvent as long as the solvent does not adversely affect the curing speed of the ink composition. In the invention, the solvent may be an organic solvent or water. In particular, an organic solvent may be added to the ink composition to improve adhesiveness of the ink composition to a recording medium (e.g., support such as paper). Examples of the solvent that may be preferably used include propylene carbonate, dimethyl succinate, dimethyl glutarate, dimethyl adipate, and mixtures thereof.

The content of the organic solvent may be, for example, in the range of 0 to 5% by mass, and preferably in the range of 0.1 to 3% by mass, with respect to the total mass of the ink composition of the invention.

In addition, the ink composition of the invention may further contain other known compound(s), if necessary. Examples of such additional compounds include at least one surfactant, at least one leveling additive, at least one matting agent, and at least one resin to adjust the physical properties of a film, such as polyester resin, polyurethane resin, vinyl resin, acrylic resin, rubber resin, and wax. Further, the ink composition preferably contains at least one tackifier that does not inhibit polymerization in view of improvement in adhesiveness to recording media made of, for example, polyolefin or PET. Specific examples thereof include high-molecular weight adhesive polymers described in JP-A No. 2001-49200, pp. 5 to 6 (e.g., a copolymer of ester of (meth) acrylic acid and alcohol having at least one alkyl group with 1 to 20 carbon atoms, a copolymer of ester of (meth)acrylic acid and alicyclic alcohol having 3 to 14 carbon atoms, and a copolymer of ester of (meth)acrylic acid and aromatic alcohol having 6 to 14 carbon atoms), and low-molecular weight adhesive resins having polymerizable unsaturated bonds.

Properties of Ink Composition

As mentioned above, the ink composition of the invention has a radiation-curable property. The method for forming images using this ink composition is not specifically limited, and general coating (application) process, transfer process, inkjet recording process and the like may be applied. In a preferable exemplary embodiment of the invention, the ink composition contains a large amount of low molecular weight compounds, i.e., the ratio of the polymerizable compounds in the ink composition is 60% by mass or more, and therefore may be suitably used for inkjet recording in view of viscosity.

Preferred physical properties of the ink composition of the invention will be described.

In view of attaining good jettability, the viscosity of the ink composition is preferably 5 to 30 mPa·s, and more preferably 7 to 25 mPa·s at the jetting temperature, which is for example, within the range of 25 to 60° C., and preferably within the range of 25 to 50° C. The viscosity of the ink composition of the invention at room temperature, which is within the range of 25 to 30° C., is preferably 10 to 50 mPa·s, and more preferably 12 to 40 mPa·s.

It is preferable that the composition of the ink composition is so adjusted as to obtain a viscosity within the above range. When the ink composition has a high viscosity at room temperature, the ink composition can be prevented from penetrating into a recording medium, even when the recording medium is porous. In addition, the amount of uncured monomer molecules and odor can be reduced. Further, bleeding of spotted ink droplets can be suppressed to consequently improve image quality.

The surface tension of the ink composition of the invention is preferably from 20 to 30 mN/m and more preferably from 23 to 28 mN/m. When a recording medium is made of polyolefin, PET, coated paper, or non-coated paper, the surface tension of the ink composition is preferably 20 mN/m or more in view of prevention of bleeding and penetration of the ink composition, or 30 mN/m or less in view of wettability of the ink composition.

Ink Jet Recording Method

Hereinafter, an ink jet recording method and an ink jet recording apparatus which may be used in the invention will be described.

The ink jet recording method of the invention includes: jetting an ink composition of the invention onto a recording medium (process (i-1)), and irradiating the jetted ink composition with active radiation to cure the ink composition (process (i-2)).

The ink jet recording method of the invention includes the above processes (i-1) and (i-2), whereby an image is formed on the recording medium by curing the ink composition on the recording medium.

An ink jet recording apparatus, which will be described below in detail, can be used in the process (i-1) of the ink jet recording method of the invention.

-Ink Jet Recording Apparatus-

There is no limit to the ink jet recording apparatus for use in the ink jet recording method of the invention. Any one of known ink jet recording apparatuses that provide images with desired resolution may be selected and used as such. That is, any one of known ink jet recording apparatuses including commercially available products may be used to jet an ink on a recording medium in the process (i-1) of the ink jet recording method of the invention.

The ink jet recording apparatus for use in the invention has, for example, an ink-supplying system, a temperature sensor, and an active radiation source. The ink-supplying system has, for example, a stock tank that stores the ink composition of the invention, supply pipes, an ink-supplying tank immediately before an ink jet head, a filter, and a piezoelectric ink jet head. Preferably, the piezoelectric ink jet head is designed according to multi size dot technology and can be so driven as to jet ink droplets having volumes of 1 to 100 pl, preferably 8 to 30 pl, at a definition of, for example, 320×320 to 4,000×4,000 dpi, preferably 400×400 to 1,600×1,600 dpi, and more preferably 720×720 dpi. The term "dpi" as used herein means the number of dots aligned per 2.54 cm.

The radiation-curable ink, such as the ink composition of the invention, can be preferably maintained at a constant temperature before the jetting. Therefore, thermal insulation and heating can be conducted in a region from the ink-supplying tank to the ink jet head. There is no particular limit to a method of controlling the temperature. For example, temperature sensors are preferably disposed in each of the pipes, so that heating can be controlled according to the flow of ink and environmental temperature. Some temperature sensors may be placed close to the ink-supplying tank and the ink jet head nozzle, respectively. Preferably, the ink jet head, which is used to heat the ink, has a main body that is thermally insulated in order to prevent outside air from affecting the temperature of the head. To shorten rise time necessary to heat the above region to a predetermined temperature or reduce loss in heat energy, it is preferable to thermally insulate the ink jet head from other units and reduce the heat capacity of the entire of a heating unit.

At jetting the ink composition for inkjet recording of the invention using the ink jet recording apparatus as described above, it is preferable that the ink composition is heated to 25 to 60° C., and more preferably 25 to 50° C. to lower the viscosity of the ink composition to 5 to 30 mPa·s, and more preferably 7 to 25 mPa·s before the jetting. The ink composition preferably has a viscosity of 35 to 500 mPa·s at 25° C. to obtain significant effects. In this case, it is possible to realize high jetting stability.

Generally, radiation-curable ink compositions, such as the ink composition of the invention, are more viscous than aqueous inks used as conventional ink jet recording inks. Therefore, fluctuation in temperature during jetting causes the viscosity of the radiation-curable ink compositions to significantly change. The fluctuation in the viscosity of the ink composition gives significant influence on the size of droplets and droplet jetting speed, causing deterioration in image quality. Thus, it is necessary to keep the temperature of the ink composition as constant as possible during jetting. The difference between the real temperature of the ink composition and the set temperature of the ink composition is preferably within ±5° C., more preferably ±2° C., and still more preferably ±1° C.

The process (i-2) of irradiating the jetted ink composition with active radiation to cure the ink composition will be described below.

The ink composition spotted on the recording medium is cured by irradiating the ink composition with active radiation. This is because the photopolymerization initiator contained in the ink composition of the invention is decomposed by irradiation of the active radiation to generate initiation species such as radicals, which initiates and accelerates polymerization reaction of the specific heterocyclic compound and if any, additional polymerizable compounds. When the ink composition contains a sensitizing dye as well as the photopolymerization initiator, the sensitizing dye in the ink composition absorbs the active radiation ray and thereby becomes an excited state. When the excited sensitizing dye comes into contact with the photopolymerization initiator, the sensitizing dye accelerates decomposition of the photopolymerization initiator to allow progress of highly sensitive curing reaction.

Here, examples of the active radiation ray includes α-ray, γ-ray, electron beams, X-ray, ultraviolet rays, visible light and infrared light, and among these, any of electron beams, ultraviolet rays, and visible light is preferred. A desired peak wavelength for the active radiation depends on the absorption property of the sensitizing dye, if any. However, the peak wavelength of the active radiation is preferably 200 to 600 nm, more preferably 300 to 450 nm, and still more preferably 350 to 420 nm.

The polymerization initiation system in the ink composition of the invention is sufficiently sensitive to radiation rays even at low output. Thus, the output of the radiation rays is preferably 2,000 mJ/cm$^2$ or less, more preferably 10 to 2,000 mJ/cm$^2$, still more preferably 20 to 1,000 mJ/cm$^2$, and most preferably 50 to 800 mJ/cm$^2$.

The illuminance of the active radiation at an exposed surface is desirably 10 to 2,000 mW/cm$^2$, and preferably 20 to 1,000 mW/cm$^2$.

A mercury lamp, or a gas- or solid-state laser is mainly used as the active radiation source, and a mercury lamp or metal halide lamp is widely known as the light source to cure a UV-curable ink composition. However, there is a strong need for mercury-free devices from the viewpoint of environmental protection. Substitution thereof with a GaN semiconductor ultraviolet ray-emitting device is very useful from the industrial and environmental standpoints. In addition, LED's (UV-LEDs) and LD's (UV-LDs), which have a small size, a long lifetime, a high efficiency and low costs, are attracting attention as light sources for radiation-curing ink jet printers.

A light-emitting diode (LED) or a laser diode (LD) may be used as the active radiation source. In particular, an ultraviolet LED or an ultraviolet LD may be used if an ultraviolet ray source is needed. For example, a purple LED emitting light with a main peak wavelength within the range of 365 to 420 nm is available from Nichia Corporation. If light having a still shorter wavelength is needed, U.S. Pat. No. 6,084,250 discloses an LED that can emit radiation rays having a central wavelength within the range of 300 to 370 nm. Other ultraviolet LEDs are also commercially available. Radiation rays having different ultraviolet ray bands may be irradiated. The radiation ray source in the invention is preferably a UV-LED, and more preferably a UV-LED having a peak wavelength within the range of 350 to 420 nm.

The maximum illuminance of LED on a recording medium is preferably 10 to 2,000 mW/cm$^2$, more preferably 20 to 1,000 mW/cm$^2$, and still more preferably 50 to 800 mJ/cm$^2$.

The time during which the ink composition of the invention is exposed to the active radiation may be 0.01 to 120 seconds, and preferably 0.1 to 90 seconds.

Irradiation conditions and a basic method of irradiating active radiation are disclosed in JP-A No. 60-132767. Specifically, the active radiation is irradiated in a so-called shuttle manner in which a head unit having an ink-jetting element, and light sources placed at both sides of the head unit are driven. The irradiation of the active radiation starts when a specific period of time (e.g., 0.01 to 0.5 seconds, preferably 0.01 to 0.3 seconds, and more preferably 0.01 to 0.15 seconds) has lapsed since spot of the ink on a recording medium. Extremely shortening a time starting at the ink spotting and ending at the start of the irradiation makes it possible to prevent bleeding of the ink spotted on the recording medium before curing. Even when the recording medium is porous, it is possible to irradiate the ink before the ink penetrating into a portion of the recording medium which portion the irradiated rays cannot reach, in this case. Thus, the amount of unreacted residual monomer can be reduced, and odor can be consequently reduced.

Alternatively, the ink may be completely cured with a fixed light source separated from the head unit. WO 99/54415 discloses an irradiation method in which an optical fiber is used and a method of irradiating recorded areas with UV rays that are collimated and reflected by a mirror placed on the side face of the head unit. These curing methods may also be applied to the recording method of the invention.

By employing the ink jet recording method described above, it becomes possible to spot ink droplets having a diameter kept constant on the surfaces of various recording media having different surface wettabilities and to improve image quality. To obtain a multi-color image, images of respective colors are preferably formed one by one in the order of increasing luminosities. Formation of images in this manner allows the irradiated ray to reach the lowest ink layer, and good curing sensitivity, decreases in the amount of the residual monomer and odor, and improved adhesiveness may be obtained. Although images of respective colors may be simultaneously irradiated with active radiation after jetting of all colors, it is preferable to separately irradiate the image of each color in order to accelerate curing.

In this way, by curing the ink composition of the invention with high sensitivity by irradiation of active radiation, it is possible to form an image with high definition and high strength on a recording medium. Further, it is also possible to form an image with excellent adhesion to the recording medium.

When the ink composition of the invention is used in an ink jet recording apparatus, it is possible to perform stable image forming since the ink composition of the invention is excellent in jetting stability without causing the precipitation of the components thereof around the nozzle.

Furthermore, the ink composition of the invention is widely applied since it cures at a high sensitivity by irradiation of an active radiation ray as mentioned above, the formed ink image is soft, and has an excellent tight adhesion to recording media.

The exemplary embodiments of the invention are listed below.

<1> An ink composition comprising:
(A) a polymerizable compound represented by the following formula (I);
(B) a polymerizable compound having a structure that is different from that of the polymerizable component (A); and
(C) a photoinitiator,

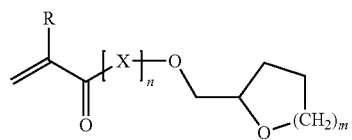

(I)

wherein, in the formula (I), R represents a hydrogen atom or a methyl group, X represents a divalent organic group, m represents an integer of 1 or 2, and n represents an integer of 1 to 20.

<2> The ink composition of <1>, wherein X in the formula (I) is represented by any of the following formulae (2) to (4), and X may be constituted as a combination of a plurality of the groups represented by the formulae (2) to (4):

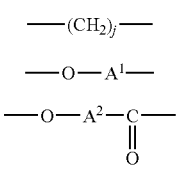

wherein, in the formula (2), j represents an integer of 1 to 12, in the formula (3), $A^1$ represents a linear or branched chain alkylene group having 2 to 4 carbon atoms, and in the formula (4), $A^2$ represents a linear or branched chain alkylene group having 2 to 8 carbon atoms.

<3> The ink composition of <1> or <2>, wherein the content of the specific polymerizable compound (A) in the composition is in the range of 1% by mass to 50% by mass with respect to the total mass of the ink composition <4> The ink composition of any one of <1> to <3>, wherein the (B) polymerizable compound having a structure that is different from that of the component (A) is a combination of a monoacrylate and a multifunctional acrylate monomer or multifunctional acrylate oligomer.

<5> The ink composition of any one of <1> to <3>, wherein the (B) polymerizable compound having a structure that is different from that of the component (A) is a combination of at least one mono functional monomer, at least one difunctional monomer, and at least one tri- or higher functional monomer.

<6> The ink composition of any one of <1> to <5>, further comprising (D) a colorant.

<7> A method for inkjet recording, comprising:
(i-1) jetting the ink composition of claim 1 on a recording medium; and
(i-2) curing the jetted ink composition by irradiating the ink composition with an active radiation ray.

EXAMPLES

Hereinafter, the present invention will be further described in detail with reference to the following examples, but it should be construed that the invention is in no way limited to the exemplary embodiments in these examples. The following examples relate to inks having different colors from each other that are used for the UV ink jet recording. Further in the following description, except where specifically noted, "part(s)" always denotes "part(s) by mass".

Example 1

A cyan color ink composition for the UV ink jet was obtained by mixing and stirring the following components with a high-speed water-cooled stirrer.

(Cyan Ink Composition)
Specific polymerizable compound (A-3) [component (A)] 14.5 parts
Monofunctional acrylate (trade name: SR339, manufactured by Sartomer Company, Inc.) [component (B)] 30.0 parts
Monofunctional acrylate (trade name: SR506, manufactured by Sartomer Company, Inc.) [component (B)] 25.5 parts
Difunctional acrylate (trade name: SR508, manufactured by Sartomer Company, Inc.) [component (B)] 2.0 parts
N-vinylcaprolactam (trade name: V-CAP, manufactured by ISP Japan Ltd.) [component (B)] 10.0 parts
Urethane acrylate oligomer (trade name: CN9002, manufactured by Sartomer Company, Inc.) [component (B)] 6.7 parts
Dispersing agent (trade name: SOLSPERSE 32000, manufactured by Noveon, Inc.) 1.2 parts
Pigment (trade name: IRGALITE BLUE GLVO, manufactured by Ciba Japan K.K.) [component (D)] 3.0 parts
Polymerization inhibitor (trade name: FIRSTCURE ST-1, manufactured by ChemFirst Inc.) 0.05 part
Photoinitiator (trade name: LUCIRIN TPO, manufactured by BASF) [component (C)] 5.0 parts
Photoinitiator (trade name: IRGACURE 369, manufactured by Ciba Japan K.K.) [component (C)] 0.5 part
Photoinitiator (trade name: IRGACURE 820, manufactured by Ciba Japan K.K.) [component (C)] 1.0 part Photoinitiator (trade name: DAROCUR ITX, manufactured by Ciba Japan K.K.) [component (C)] 0.5 part
Defoaming agent (trade name: BYK 307, manufactured by BYK Chemie) 0.05 part (Evaluation of Ink Compositions)

Recording was performed on a polyvinyl chloride sheet (trade name: FASSON 400, manufactured by Avery Dennison Corporation) using thus obtained cyan color ink composition and an ink jet recording apparatus having a piezo ink jet head (CA3 HEAD, manufactured by Toshiba Tec). The ink supplying system includes a stock tank, a supply pipe, an ink supplying tank just before an ink jet head, a filter, and a piezo ink jet head. In order to keep the nozzle at 45° C.±3° C., the temperature was controlled (printing a 100% covering image). After the ink composition was jetted, the sheet having the ink thereon was passed under illumination of an iron-doped UV lamp (power: 120 W/cm$^2$) at a speed of 40 m/sec so as to cure the ink and to obtain a printed article.

At this time, the following evaluation was carried out. The results are shown in Table 1 along with the results of the other examples and comparative examples.

<Curing Sensitivity>

Exposure energy upon curing was measured with an integrated light amount meter (UV POWER MAP, manufacture by EIT. Inc.). Evaluation was performed based on the criteria: the smaller this value, the higher the sensitivity upon curing. The ink composition of Example 1 provided an integrated UV exposure of about 400 mJ/cm$^2$, and was consequently confirmed to be cured with high sensitivity.

<Curing Property>

A printed article obtained by using this ink was exposed to light at an integrated UV exposure amount of about 400 mJ/cm$^2$ on the sheet, to cure the ink. Then, the curing property was evaluated by touching the image portion after curing. The curing property was evaluated based on a determination as to whether the surface of the cured film had tackiness or not. A cured film that does not have tackiness is evaluated as "fine", and a cured film that has tackiness is evaluated as "tacky".

As a result, it was confirmed that stickiness completely disappeared after curing, the curing property was consequently excellent, and the evaluation was "fine".

Adhesiveness to Recording Medium

The adhesiveness to a recording medium was evaluated by the cross hatch test (EN ISO2409), and the adhesiveness is expressed by using notation of from 5B to 1B in accordance with the ASTM method (ASTM D3359-07). The descriptions recited in EN ISO2409 and ASTM D3359-07 is herein incorporated by reference. 5B is the highest in adhesiveness (adhesion). 3B or higher is a level at which there is no problem in practical use.

As a result, the ink composition of Example 1 exhibits a high adhesiveness (adhesion) to the polyvinyl chloride sheet (trade name: FASSON 400, manufactured by Avery Dennison Corporation) used herein as the recording medium, and was evaluated as 5B in the notation in accordance with the ASTM method.

<Jetting Stability>

After the obtained ink composition was stored at 35° C. for 10 weeks, a test recording to a recording medium was performed with an ink jet recording apparatus having the aforementioned piezo ink jet nozzle. Upon continuous printing over 1 hour at normal temperature, presence/absence of dot loss and ink scattering was observed by visual inspection, and the jetting stability was evaluated in accordance with the following criteria. "B" and "C" are the levels that bring about problems from a practical standpoint.

A: Dot loss or ink scattering does not occur, or occurs 2 or less times;
B: Dot loss or ink scattering occurs from 2 to 10 times; and
C: Dot loss or ink scattering occurs 11 or more times.

<Flexibility of Cured Film>

The printed article having a length of 6 cm and a width of 2 cm was stretched at 50° C. together with a sheet made of polyvinyl chloride, and the elongation rate at which the image was broken was measured. The flexibility of the cured film was evaluated according to the following criteria.

A: elongation rate was 150% or more (the sample was elongated to 15 cm or more)
B: elongation rate was 100% or more and lower than 150% (the sample was elongated to 12 cm or more and lower than 15 cm)
C: elongation rate was 50% or more and lower than 100% (the sample was elongated to 9 cm or more and lower than 12 cm)
D: elongation rate was lower than 50% (the sample was broken at lower than 9 cm)

<Antiblocking Property>

A sheet made of polyvinyl chloride on which printing had not been performed was faced toward the printed surface of a printed article of 105 mm×148 mm and tightly attached thereto, and a load of 4 kg was applied at room temperature (about 25° C.) for 48 hours. The sheets were separated, and the adhesion of the ink to the sheet on which printing had not performed was observed and evaluated according to the following criteria.

A: no adhesion of the ink was observed
B: slight adhesion of the ink was observed
C: ink was attached on the sheet on which printing had not been performed Example 2

A magenta color ink composition for the UV ink jet was obtained by mixing and stirring the following components with a high-speed water-cooled stirrer.

(Magenta Ink Composition)
Specific polymerizable compound (A-5) [component (A)] 13.0 parts
N-vinylcaprolactam (trade name: V-CAP, manufactured by ISP Japan Ltd.) [component (B)] 15.0 parts
Difunctional acrylate (trade name: SR9045, manufactured by Sartomer Company, Inc.) [component (B)] 10.7 parts
Monofunctional acrylate (trade name: SR339, manufactured by Sartomer Company, Inc.) [component (B)] 59.0 parts
Multifunctional acrylate (trade name: SR399, manufactured by Sartomer Company, Inc.) [component (B)] 11.0 parts
Vinyl ether compound (trade name: RAPI-CURE DVE-3, manufactured by ISP Europe) [component (B)] 4.0 parts
Dispersing agent (trade name: SOLSPERSE 32000, manufactured by Noveon, Inc.) 1.2 parts
Pigment (trade name: CINQUASIA MAZENTA RT-355D, manufactured by Ciba Japan K.K.) [component (D)] 3.6 parts
Polymerization inhibitor (trade name: FIRSTCURE ST-1, manufactured by ChemFirst Inc.) 0.05 part
Photoinitiator (trade name: LUCIRIN TPO, manufactured by BASF) [component (C)] 5.0 parts
Photoinitiator (trade name: IRGACURE 379, manufactured by Ciba Japan K.K.) [component (C)] 0.4 part
4-Phenylbenzophenone (manufactured by Tokyo Chemical Industry Co., Ltd.) [component (C)] 1.0 part Photoinitiator (trade name: DAROCUR ITX, manufactured by Ciba Japan K.K.) [component (C)] 1.0 part
Defoaming agent (trade name: BYK 307, manufactured by BYK Chemie) 0.05 part The resultant magenta color ink was jetted on a polyvinyl chloride sheet in the same manner as in Example 1, and cured. The printed article using this ink was evaluated in the same manner as in Example 1.

Example 3

A black color ink composition for the UV ink jet was obtained by mixing and stirring the following components with a high-speed water-cooled stirrer.
(Black Ink Composition)
Specific polymerizable compound (A-4) [component (A)] 22.0 parts
Monofunctional acrylate (trade name: SR339, manufactured by Sartomer Company, Inc.) [component (B)] 40.0 parts
Monofunctional acrylate (trade name: SR489, manufactured by Sartomer Company, Inc.) [component (B)] 21.2 parts
Multifunctional acrylate (trade name: SR399, manufactured by Sartomer Company, Inc.) [component (B)] 1.0 part
Vinyl ether compound (trade name: RAPI-CURE DVE-3, manufactured by ISP Europe) [component (B)] 5.0 parts
Dispersing agent (trade name: SOLSPERSE 32000, manufactured by Noveon, Inc.) 1.2 parts
Pigment (trade name: MICROLITH BLACK C-K, manufactured by Ciba Japan K.K.) [component (D)] 2.6 parts
Polymerization inhibitor (trade name: FIRSTCURE ST-1, manufactured by ChemFirst Inc.) 0.05 part
Photoinitiator (trade name: LUCIRIN TPO, manufactured by BASF) [component (C)] 4.4 parts
Photoinitiator (trade name: IRGACURE 379, manufactured by Ciba Japan K.K.) [component (C)] 0.5 part
4-Phenylbenzophenone (manufactured by Tokyo Chemical Industry Co., Ltd.) [component (C)] 1.0 part
Photoinitiator (trade name: DAROCUR ITX, manufactured by Ciba Japan K.K.) [component (C)] 1.0 part
Defoaming agent (trade name: BYK 307, manufactured by BYK Chemie) 0.05 part The resultant black color ink was jetted on a polyvinyl chloride sheet in the same manner as in Example 1, and cured. A printed article of this ink was evaluated in the same manner as in Example 1.

Example 4

A white color ink composition for the UV ink jet was obtained by mixing and stirring the following components with a high-speed water-cooled stirrer.
(White Ink Composition)
Specific polymerizable compound (A-9) [component (A)] 16.0 parts
Difunctional acrylate (trade name: SR9045, manufactured by Sartomer Company, Inc.) [component (B)] 14.0 parts
Monofunctional acrylate (trade name: SR339, manufactured by Sartomer Company, Inc.) [component (B)] 33.0 parts
Multifunctional acrylate (trade name: SR399, manufactured by Sartomer Company, Inc.) [component (B)] 13.0 parts
Dispersing agent (trade name: SOLSPERSE 36000, manufactured by Noveon, Inc.) 2.4 parts
Pigment (trade name: MICROLITH WHITE R-A, manufactured by Ciba Japan K.K.) [component (D)] 16.0 parts
Polymerization inhibitor (trade name: FIRSTCURE ST-1, manufactured by ChemFirst Inc.) 0.05 part
Photoinitiator (trade name: LUCIRIN TPO, manufactured by BASF JAPAN LTD.) [component (C)] 4.0 parts
Photoinitiator (trade name: IRGACURE 379, manufactured by Ciba Japan K.K.) [component (C)] 0.2 part
4-Phenylbenzophenone (manufactured by Tokyo Chemical Industry Co., Ltd.) [component (C)] 1.2 parts
Photoinitiator (trade name: DAROCUR ITX, manufactured by Ciba Japan K.K.) [component (C)] 0.1 part
Defoaming agent (trade name: BYK 307, manufactured by BYK Chemie) 0.05 part The resultant white color ink was jetted on a polyvinyl chloride sheet in the same manner as in Example 1, and cured. A printed article of this ink was evaluated in the same manner as in Example 1.

Comparative Example 1

A white color ink composition for the UV ink jet was obtained by mixing and stirring the following components with a high-speed water-cooled stirrer.
(White Ink Composition)
Difunctional acrylate (trade name: SR9045, manufactured by Sartomer Company, Inc.) [component (B)] 14.0 parts
Monofunctional acrylate (trade name: SR339, manufactured by Sartomer Company, Inc.) [component (B)] 49.0 parts
Multifunctional acrylate (trade name: SR399, manufactured by Sartomer Company, Inc.) [component (B)] 13.0 parts
Dispersing agent (trade name: SOLSPERSE 36000, manufactured by Noveon, Inc.) 2.4 parts
Pigment (trade name: MICROLITH WHITE R-A, manufactured by Ciba Japan K.K.) [component (D)] 16.0 parts
Polymerization inhibitor (trade name: FIRSTCURE ST-1, manufactured by ChemFirst Inc.) 0.05 part
Photoinitiator (trade name: LUCIRIN TPO, manufactured by BASF JAPAN LTD.) [component (C)] 4.0 parts
Photoinitiator (trade name: IRGACURE 379, manufactured by Ciba Japan K.K.) [component (C)] 0.2 part
4-Phenylbenzophenone (manufactured by Tokyo Chemical Industry Co., Ltd.) [component (C)] 1.2 parts
Photoinitiator (trade name: DAROCUR ITX, manufactured by Ciba Japan K.K.) [component (C)] 0.1 part
Defoaming agent (trade name: BYK 307, manufactured by BYK Chemie) 0.05 part The resultant white color ink composition of Comparative Example 1 was jetted on a polyvinyl chloride sheet in the same manner as in Example 1, and cured. Curing sensitivity, curing property, adhesiveness, and jetting stability were evaluated in the same manner as in Example 1.

Comparative Example 2

A white color ink composition for the UV ink jet was obtained by mixing and stirring the following components with a high-speed water-cooled stirrer.
(White Ink Composition)
Tetrahydrofurfuryl acrylate (trade name: SR285, manufactured by Sartomer Company, Inc.) [component (B)] 16.0 parts Difunctional acrylate (trade name: SR9045, manufactured by Sartomer Company, Inc.) [component (B)] 14.0 parts
Monofunctional acrylate (trade name: SR339, manufactured by Sartomer Company, Inc.) [component (B)] 33.0 parts
Multifunctional acrylate (trade name: SR399, manufactured by Sartomer Company, Inc.) 13.0 parts
Dispersing agent (trade name: SOLSPERSE 36000, manufactured by Noveon, Inc.) 2.4 parts
Pigment (trade name: MICROLITH WHITE R-A, manufactured by Ciba Japan K.K.) [component (D)] 16.0 parts
Polymerization inhibitor (trade name: FIRSTCURE ST-1, manufactured by ChemFirst Inc.) 0.05 part
Photoinitiator (trade name: LUCIRIN TPO, manufactured by BASF JAPAN LTD.) [component (C)] 4.0 part
Photoinitiator (trade name: IRGACURE 379, manufactured by Ciba Japan K.K.) [component (C)] 0.2 part
4-Phenylbenzophenone (manufactured by Tokyo Chemical Industry Co., Ltd.) [component (C)] 1.2 parts
Photoinitiator (trade name: DAROCUR ITX, manufactured by Ciba Japan K.K.) [component (C)] 0.1 part
Defoaming agent (trade name: BYK 307, manufactured by BYK Chemie) 0.05 part The resultant white color ink composition of Comparative Example 2 was jetted on a polyvinyl chloride sheet in the same manner as in Example 1, and cured. Curing sensitivity, curing property, adhesiveness, and jetting stability were evaluated in the same manner as in Example 1.

TABLE 1

| | Sensitivity (mJ/cm²) | Curing property | Adhesion property | Jetting stability | Flexibility of image | Antiblocking property |
|---|---|---|---|---|---|---|
| Example 1 | 400 | Fine | 5B | A | A | A |
| Example 2 | 400 | Fine | 5B | A | A | A |
| Example 3 | 400 | Fine | 5B | A | A | A |
| Example 4 | 400 | Fine | 4B | A | A | A |
| Comparative example 1 | 550 | Tacky | 3B | B | B | B |
| Comparative example 2 | 400 | Fine | 4B | B | A | C |

As is apparent from Table 1, the ink compositions of the invention had a fine jetting stability, cured at a high sensitivity by irradiation of a ultraviolet ray, and had a fine curing property; and the formed images were soft and excellent in tight adhesion to the recording medium, and had an excellent antiblocking property due to its fine curing property. On the other hand, the ink composition of Comparative Example 1, which did not include the specific polymerizable compound (A) in the invention, was poor in curing sensitivity and curing property, and had an insufficient tight adhesion to the recording medium; and the ink composition of Comparative Example 2, which included a comparative polymerizable compound, tetrahydrofurfuryl acrylate, instead of the specific polymerizable compound (A), had an improved curing sensitivity but had a low jetting stability, and had an antiblocking property of a practically problematic level due to the bleeding of the low molecular weight components over time.

The invention may provide an ink composition that has a high sensitivity to irradiation of an active radiation ray, may form an image having an excellent curing property, and provides a fine adhesion between the cured image and recording medium. Specifically, the invention may provide an ink composition that provides an excellent jetting stability during use in an inkjet apparatus and being preferable for inkjet recording, and a method for inkjet recording method using the ink composition of the invention.

What is claimed is:
1. An ink composition comprising:
(A) a polymerizable compound represented by the following formula (I);
(B) a polymerizable compound having a structure that is different from that of the polymerizable component (A); and
(C) a photoinitiator,

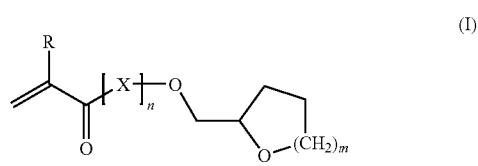

wherein, in the formula (I), R represents a hydrogen atom or a methyl group, X represents a divalent organic group, m represents an integer of 1 or 2, and n represents an integer of 1 to 20, and
the total content of the (A) polymerizable compound represented by formula (I) and the (B) polymerizable compound having a structure that is different from that of the polymerizable component (A) is from 70% by mass to 90% by mass relative to a total mass of the ink composition.

2. The ink composition of claim 1, wherein X in the formula (I) is represented by any of the following formulae (2) to (4), and X may be constituted as a combination of a plurality of the groups represented by the formulae (2) to (4):

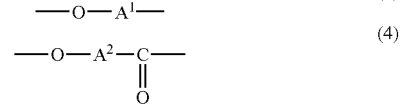

wherein, in the formula (2), j represents an integer of 1 to 12, in the formula (3), $A^1$ represents a linear or branched chain alkylene group having 2 to 4 carbon atoms, and in the formula (4), $A^2$ represents a linear or branched chain alkylene group having 2 to 8 carbon atoms.

3. The ink composition of claim 1, wherein the content of the specific polymerizable compound (A) in the composition is in the range of 1% by mass to 50% by mass with respect to the total mass of the ink composition.

4. The ink composition of claim 1, wherein the (B) polymerizable compound having a structure that is different from that of the component (A) is a combination of a monoacrylate and a multifunctional acrylate monomer or multifunctional acrylate oligomer.

5. The ink composition of claim 1, wherein the (B) polymerizable compound having a structure that is different from that of the component (A) is a combination of at least one mono functional monomer, at least one difunctional monomer, and at least one tri- or higher functional monomer.

6. The ink composition of claim 1, further comprising (D) a colorant.

7. A method for inkjet recording, comprising:
(i-1) jetting the ink composition of claim 1 on a recording medium; and
(i-2) curing the jetted ink composition by irradiating the ink composition with an active radiation ray.

8. The ink composition of claim 1, further comprising a solvent, wherein the solvent is an organic solvent or water, and the content of the organic solvent and/or water is from 0 to 5% by mass with respect to a total mass of the ink composition.

9. The ink composition of claim 2, wherein, in the formula (3), $A^1$ represents a linear alkylene group having 2 to 4 carbon atoms.

* * * * *